Oct. 14, 1958   G. C. BERTICEVICH   2,855,882
MACHINE FOR TREATING AND HANDLING FLIMSY MATERIAL
Filed July 8, 1954   6 Sheets-Sheet 1
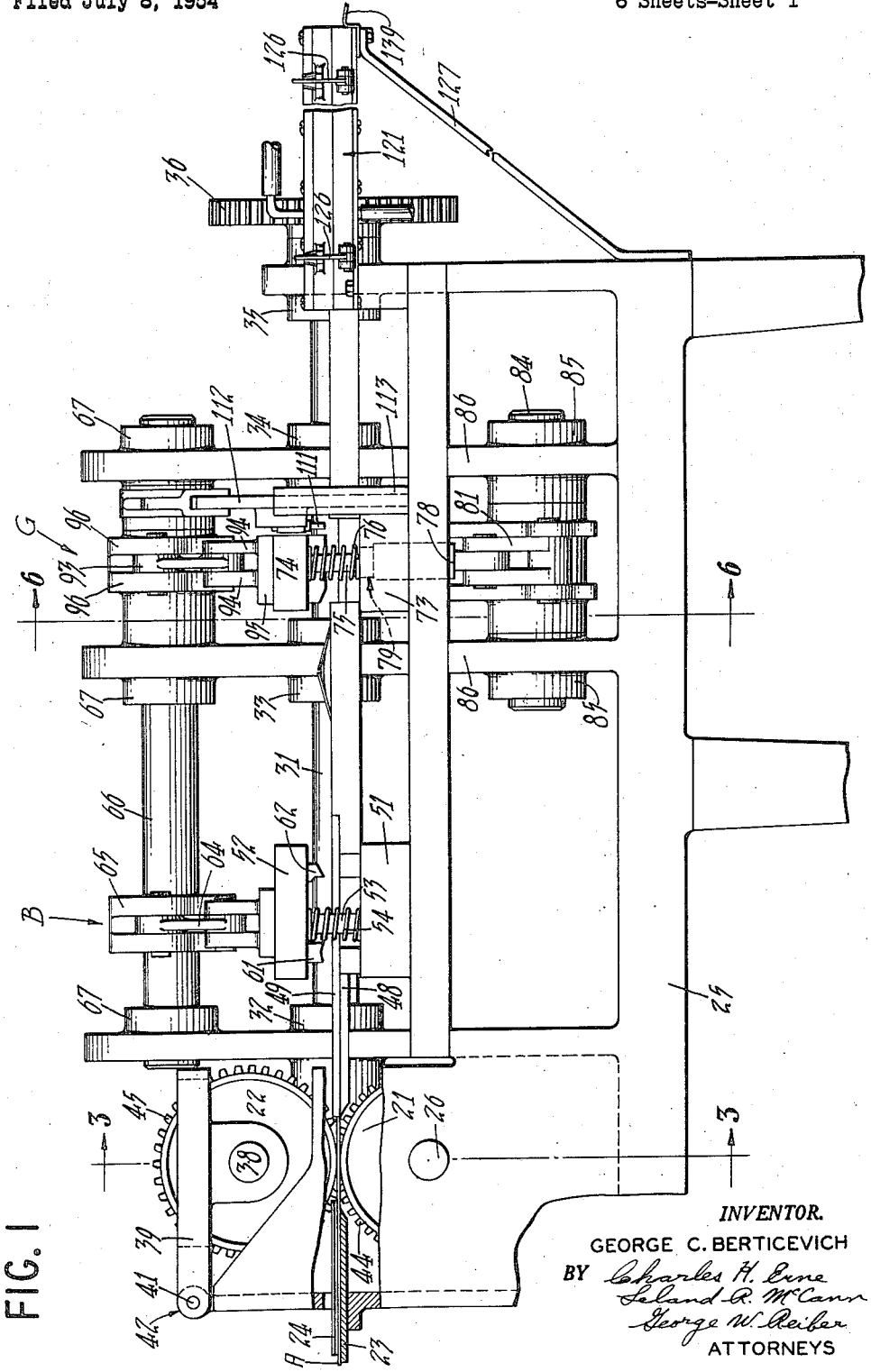
FIG. I
INVENTOR.
GEORGE C. BERTICEVICH
BY Charles H. Erne
Leland R. McCann
George W. Reiber
ATTORNEYS

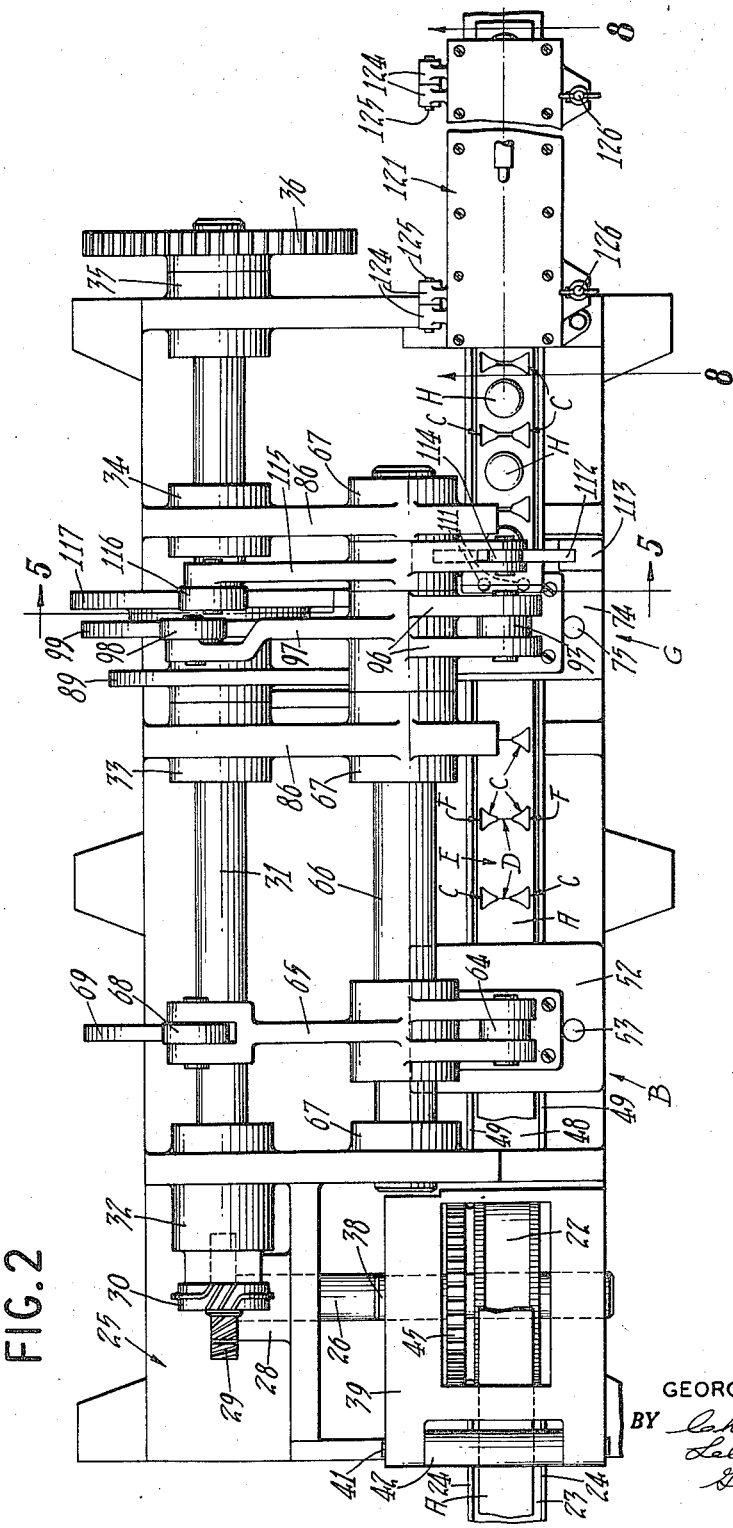

Oct. 14, 1958     G. C. BERTICEVICH     2,855,882
MACHINE FOR TREATING AND HANDLING FLIMSY MATERIAL
Filed July 8, 1954     6 Sheets-Sheet 3
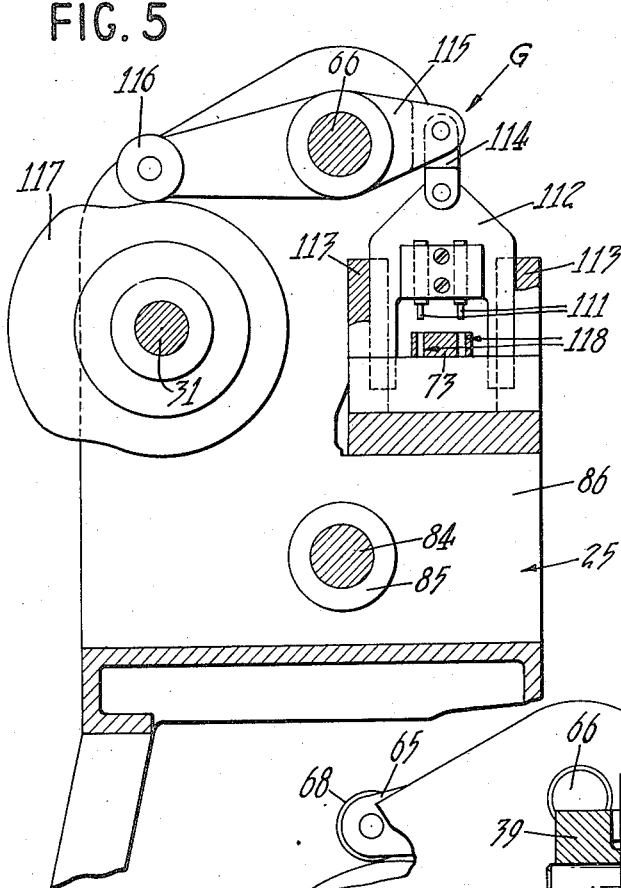
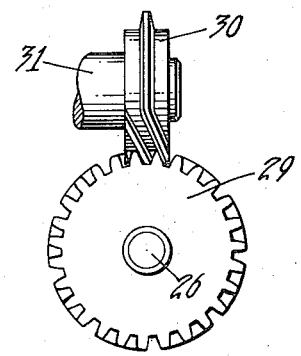
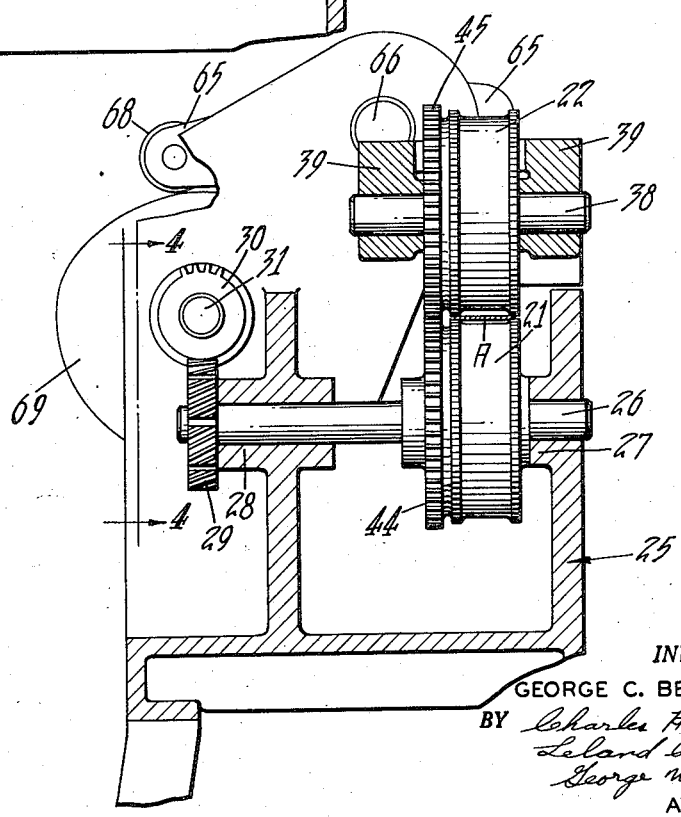
INVENTOR.
GEORGE C. BERTICEVICH
BY
ATTORNEYS Oct. 14, 1958 G. C. BERTICEVICH 2,855,882
MACHINE FOR TREATING AND HANDLING FLIMSY MATERIAL
Filed July 8, 1954 6 Sheets-Sheet 4

INVENTOR.
GEORGE C. BERTICEVICH
BY
ATTORNEYS

Oct. 14, 1958 G. C. BERTICEVICH 2,855,882
MACHINE FOR TREATING AND HANDLING FLIMSY MATERIAL
Filed July 8, 1954 6 Sheets-Sheet 5
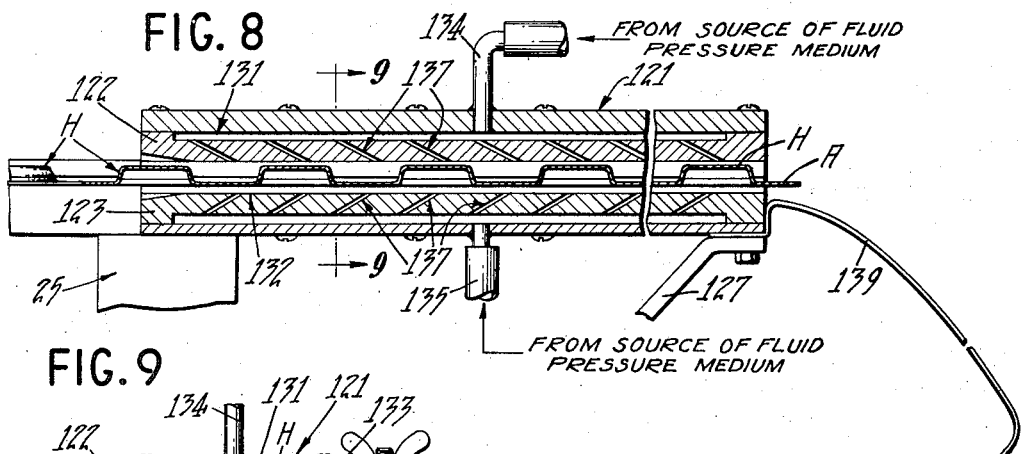
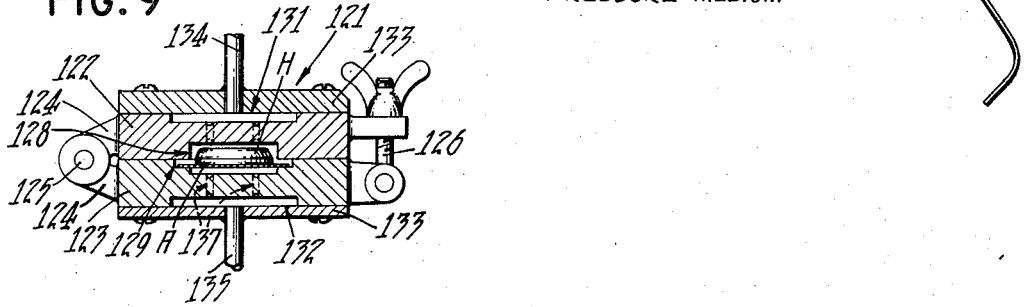
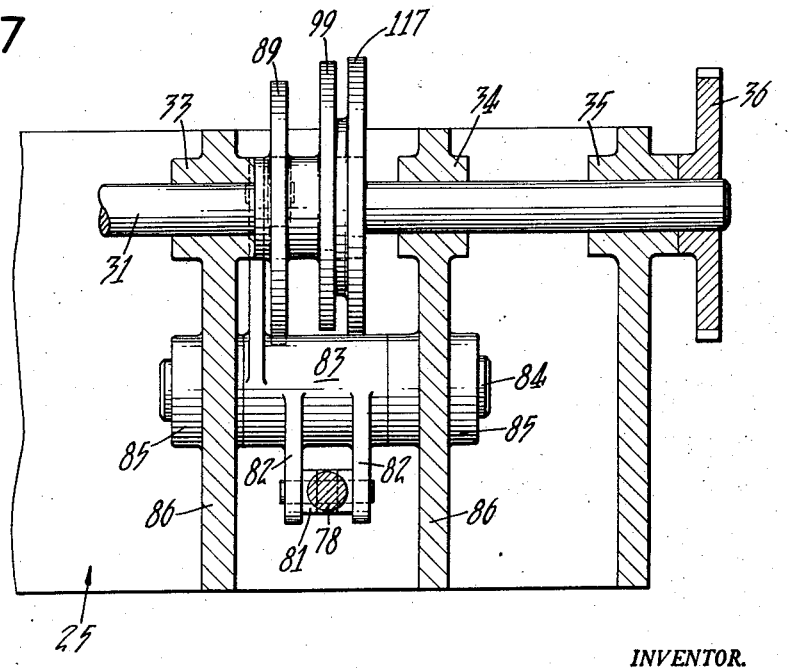
INVENTOR.
GEORGE C. BERTICEVICH
BY
ATTORNEYS Oct. 14, 1958  G. C. BERTICEVICH  2,855,882
MACHINE FOR TREATING AND HANDLING FLIMSY MATERIAL
Filed July 8, 1954  6 Sheets-Sheet 6
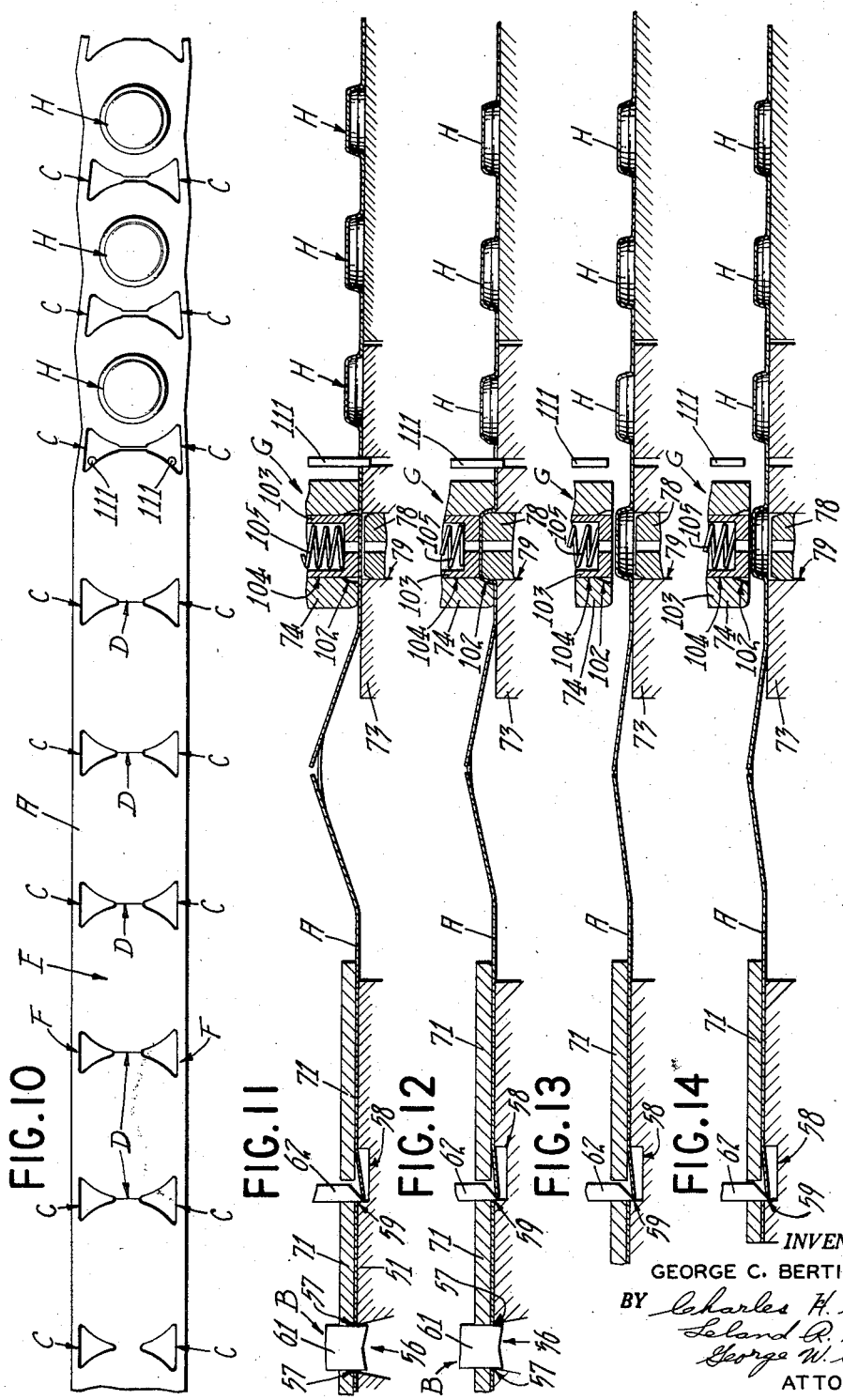
INVENTOR.
GEORGE C. BERTICEVICH
ATTORNEYS

United States Patent Office

2,855,882
Patented Oct. 14, 1958

2,855,882

MACHINE FOR TREATING AND HANDLING FLIMSY MATERIAL

George C. Berticevich, San Francisco, Calif., assignor to American Can Company, New York, N. Y., a corporation of New Jersey Application July 8, 1954, Serial No. 442,130

6 Claims. (Cl. 113—43)

The present invention relates to a machine for treating and handling flimsy sheet material for the manufacture of articles therefrom and has particular reference to devices for holding the sheet material taut and under a resilient tension to permit proper feeding of the material through the machine.

An object of the invention is the provision of a machine for treating and handling flimsy sheet material wherein the material is maintained in a free floating taut condition by a fluid pressure projected against the material in a direction designed to pull the material through a working station so that the material is held yieldable and so that it may be drawn back into the station without damage during treatment at the station.

Another object is the provision of such a machine wherein substantially continuous thin strip material subject to drawing operations and the like to produce cupped articles therefrom may be held taut in a fluid slip grip to provide for drawing-in of the material during the drawing operation and to provide for advancement of the material after the operation.

Another object is the provision of such a machine wherein flimsy material such as light weight fibrous material and metal foil which is easily torn and distorted may be readily advanced through one or more working stations and yet may be held taut for treatment at the stations without damage.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a machine embodying the instant invention, with parts broken away and parts shown in section;

Fig. 2 is a top plan view of the machine shown in Fig. 1, with parts broken away;

Fig. 3 is a transverse sectional view taken substantially along the line 3—3 in Fig. 1, with parts broken away;

Fig. 4 is an enlarged detailed elevational view of meshing interrupted thread gears used in the machine as viewed along a plane indicated by the lines 4—4 in Fig. 3;

Figure 6:
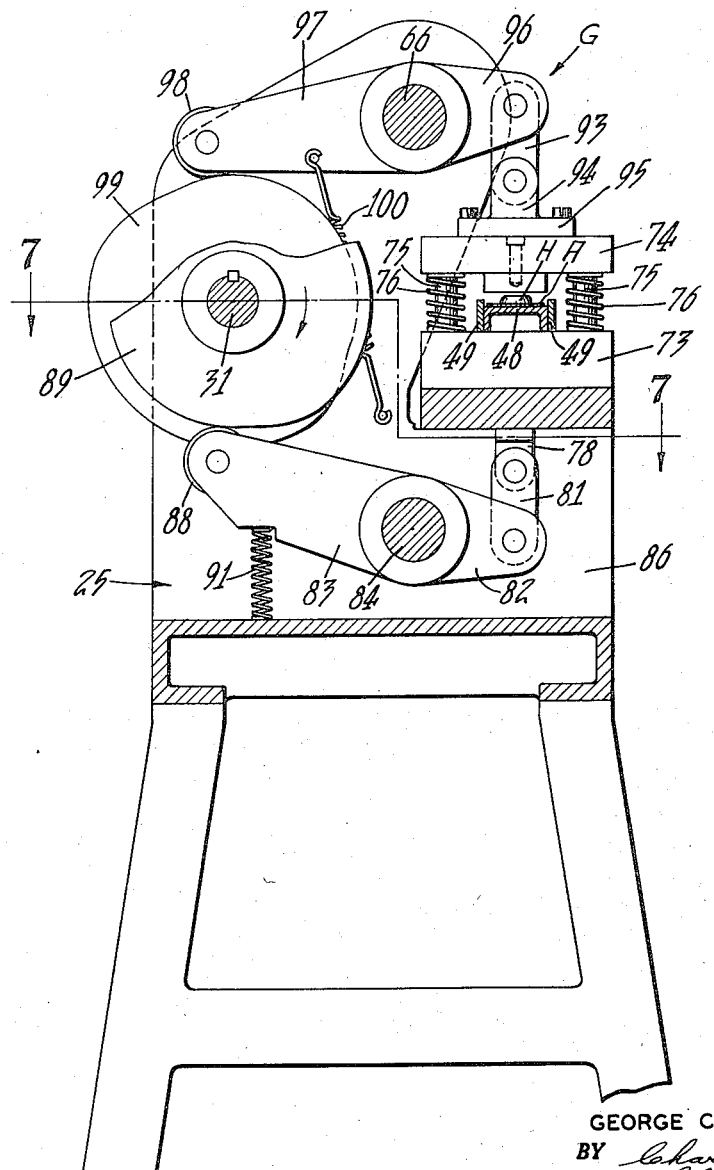

Figs. 5 and 6 are transverse sections taken along the lines 5—5, 6—6 in Figs. 2 and 1 respectively, parts being broken away;

Fig. 7 is a plan sectional view taken substantially along the broken line in 7—7 in Fig. 6 and turned through an angle of 90 degrees, parts being broken away;

Fig. 8 is an enlarged longitudinal section taken substantially along the line 8—8 in Fig. 2, with parts broken away;

Fig. 9 is a transverse sectional view taken substantially along the line 9—9 in Fig. 8;

Fig. 10 is an enlarged plan view of an exemplary strip of sheet material fed through the machine and formed to produce articles therefrom; and Figs. 11, 12, 13 and 14 are diagrammatic sectional views of parts of the machine and the strip of material shown in Fig. 10, the views illustrating steps incidental to the forming of the strip during its passage through the machine to produce articles therefrom.

As a preferred or exemplary embodiment of the instant invention the drawings illustrate a machine for piercing and drawing portions of a substantially continuous strip A (Fig. 10) of thin fibrous material to partially form the friction plug closure elements of the well known fibre milk containers of the character disclosed in United States Patent 2,570,266 issued October 9, 1951, to R. E. J. Nordquist on Container.

In the machine the strip A is advanced in a step-by-step manner through a working station B where the strip is pierced at spaced intervals along its length to form spaced sets of two oppositely disposed triangular openings C (Fig. 10) located adjacent the outer edges of the strip. At this same station B, but upon advancement of the strip A through one step, a slit D is cut transversely of the strip to connect the oppositely disposed triangular openings C as shown in Fig. 10. The slits D and openings C of adjacent sets of openings define between them loose or partially detached areas E which are tied together only by narrow continuous portions F which extend along the two outer edges of the strip.

At a subsequent working station G these partially detached areas E are subjected to a drawing action which forms inverted cup shaped friction plugs H in the strip. These operations are performed in the strip A in such a manner as to retain the partially completed friction plug elements in connected strip form so as to retain complete control over the various operations. Upon leaving the machine the friction plug areas are severed from the strip to produce individual friction plug closure elements.

The feeding of the strip A into the machine preferably is primarily effected by a pair of intermittently rotated feed rollers 21, 22 (Figs. 1, 2 and 3) disposed on edge, one above the other for the passage of the strip A between them. The strip A may be received from a roll of such material or any other suitable source and is guided into position between the feed rollers 21, 22 by a support table 23 and side guides 24 carried in a frame 25 which constitutes the main frame of the machine.

The lower feed roller 21 is mounted on a driven shaft 26 journaled in a pair of spaced bearings 27, 28 formed in the frame 25. The shaft 26 is rotated intermittently through spaced partial rotations by a conventional interrupted thread gear 29 which meshes with and is driven by a worm pinion 30 (see Fig. 4) carried on a continuously rotating main drive shaft 31. The main shaft 31 extends longitudinally of the machine and is journaled in a series of four spaced bearings 32, 33, 34, 35 formed in the machine frame 25 (see Fig. 2). The shaft is driven in any suitable manner through a driving gear 36 carried on one end of the shaft.

The upper feed roller 22 is mounted on a short shaft 38 carried in a hingeable horizontally disposed bracket 39 one end of which is mounted on a pivot pin 41 secured in a hinge lug 42 formed on the main frame 25. This hingeable support for the upper roller 22 permits the roller, through its own weight, or with the help of suitable compression springs (not shown), to yieldably press against the lower roller 21 and thus serve as a pressure roller to exert a frictional advancing or driving pressure against the strip A interposed between the rollers. The upper roller 22 is connected to the lower roller 21 for simultaneous rotation therewith, by a pair of meshing spur gears 44, 45 which are carried on the respective roller shafts 26, 38.

Hence, as the main drive shaft 31 rotates the worm pinion 30 continuously, the worm pinion during each of its revolutions, rotates the interrupted thread gear 29 and shaft 26 through a partial rotation and thus rotates the feed rollers 21, 22 through the same partial rotation to advance the strip A in a step-by-step advancement through the machine. The partial rotations of the gear 29 and feed rollers 21, 22 are designed to advance the strip A through equally spaced predetermined distances which are equal to the distance between the slits D in the strip to provide for equal spacing and equal areas in the plug areas E.

The feed rollers 21, 22 feed the strip A into the first working station B where the triangular openings C and the slits D are cut in the strip. During this advancement the strip is supported on a support table 48 (Figs. 1 and 2) and is guided by side guides 49 which are supported in the frame 25. The table 48 and guides 49 extend through the working station B and guide the strip between a lower stationary die member 51 and an upper cooperating vertically reciprocable die member or head 52 (see Fig. 1). The die members 51, 52 are retained in vertically aligned relation by pilot pins 53 surrounded by compression springs 54 interposed between the members.

The lower stationary die member 51 is formed with a pair of transversely spaced triangular die openings 56 (Figs. 11 and 12) having cut edges 57 of a shape and location identical with the openings C to be cut into the strip A. This lower die member 51 is also provided with a transverse recess 58 having a transverse cut edge 59 for cutting the slit D in the strip. The cut edge 59 is located beyond the die openings 56 a distance equal to one step of advancement of the strip A.

For cutting cooperation with the die opening cut edges 57 and the transverse cut edge 59, the vertically reciprocable die head 52 carries a pair of depending transversely disposed punches 61 aligned with the die openings 56 and a depending shearing blade 62 aligned with the transverse cutting edge 59. The head 52 is suspended from the lower end of a vertical link 64 (Fig. 1) pivotally mounted on one end of a rocker arm 65 freely carried on a pivot shaft 66 secured in spaced bearings 67 formed in the main frame 25. The opposite end of the rocker arm 65 carries a cam roller 68 (see also Fig. 3) which rides on the outer periphery of an edge cam 69 mounted on and rotating with the main shaft 31.

The edge cam 69 is timed so that it moves the die head 52 down through a cutting stroke immediately after an advancement of the strip A by the feed rollers 21, 22. Hence while the feed rollers 21, 22 and the strip A are at rest, the downward moving die head 52 plunges its cutting punches 61 and shearing blade 62 through the strip and into the stationary die 51. This action cuts the two oppositely disposed triangular openings C in the strip at the entering end of the die 51 and simultaneously, at the exit end of the die, cuts the slit D between the two openings C made in the strip during the immediately preceding cutting stroke of the head 52, as best shown in Figs. 10 and 11.

Immediately following this cutting operation, the edge cam 69 moves the die head 52 upwardly clear of the strip A and die 51 and holds it at this elevation for a repeat operation of the strip after the next following stepped advancement of the strip. A stripper plate 71 (Figs. 11 and 12) disposed above the stationary die member 51 in spaced relation thereto holds the strip A in place on the die for the cutting operation and strips the cut strip off the punches 61 and blade 62 as the head 52 rises to its elevated position.

During subsequent feeding operations of the feed rollers 21, 22, each plug area E of the strip A is advanced step-by-step through a plurality of idle stations and then enters the working station G. At this working station G a partially detached area E of the strip A is precisely located for the drawing operation which produces the friction plug H in the strip. This drawing operation is performed by a drawing die which is located at the station G and which comprises a stationary lower die member 73 (Figs. 1 and 6) and a vertically aligned reciprocable die member or head 74. Pilot pins 75 carried in the member 73 and on which the head 74 slides, with compression springs 76 interposed between the member and the head, keep the member and the head in vertical alignment.

The lower stationary die member 73 is secured to the machine frame 25 with the top of the member flush with the strip support rail 48 to support the strip A during its advancement through the station G. This die member 73 contains a vertically movable plug forming element 78 (see Figs. 1 and 11) which operates in a bore 79 in the member. The element 78 is normally disposed in a retracted position within the die member 73 where it is below the top of the member as shown in Fig. 11 but is movable upwardly above the top of the member 73 as shown in Fig. 12 to perform the plug forming operation in the strip.

Vertical movement of the plug forming element 78 is effected by cam action in time with the other operations of the machine and while the strip A is at rest at the working station G. For this purpose the lower end of the forming element 78 projects below the die member 73 and is pivotally attached to the upper bifurcated end of a depending link 81 (see Figs. 1, 6 and 7). The lower end of the link 81 is interposed between and is pivotally attached to a pair of spaced and parallel lever arms 82 which extend from a cam lever 83 mounted on a short pivot shaft 84 carried in a pair of spaced bearings 85 formed in vertical web sections 86 of the frame 25. The outer end of the cam lever 83 carries a cam roller 88 which operates against an edge cam 89 keyed to the main drive shaft 31. A compression spring 91 (Fig. 6) interposed between the lever arm 83 and the frame 25 keeps the cam roller 88 in engagement with the edge cam 89.

The upper reciprocable die head 74 is movable toward and away from the stationary die member 73 through a link 93 (Figs. 1, 2 and 6), the lower end of which is interposed between and is pivotally attached to a pair of upright lugs 94 which extend up from a bracket 95 secured to the die head 74. The upper end of the link 93 is disposed between and is pivotally attached to a pair of spaced and parallel arms 96 of a cam lever 97 freely mounted on the long pivot shaft 66 hereinbefore mentioned. The outer end of the cam lever 97 carries a cam roller 98 which operates against an edge cam 99 carried on the main drive shaft 31. A tension spring 100 (Fig. 6) secured to the cam lever 97 and the adjacent web 86 of the frame 25 keeps the roller 98 in engagement with the cam.

The lower face of the die head 74 is provided with a plug forming recess 102 (Figs. 11 through 14) which is vertically aligned with the plug forming element 78 in the stationary die member 73 for cooperation therewith in forming the plug H in the strip. The die head 74 also carries a yieldable pressure element 103 which is disposed in a vertical bore 104 vertically aligned with the plug forming recess 102. The pressure element is backed up by a compression spring 105 interposed between the pressure element and the head 74 at the upper end of the bore 104. In the normal position of the pressure element 103, its lower face is flush with the bottom face of the die head 74.

The cams 89, 99 which actuate the moving parts of this die mechanism at the station G are designed to operate the die head 74 and the plug forming element 78 in a timed sequence while an area E of the strip A is located at and is at rest at the station G, i. e. between feeding operations of the feed rollers 21, 22. In this sequence the die head 74 moves down toward the stationary die member 73 and clamps or holds the strip A against the die member 73 in a predetermined slip grip as shown in Fig. 11. While the die head 74 is momentarily held in this position, the plug forming element 78 moves up against the strip A and draws the material of the strip up into the plug forming recess 102 of the die head 74 as best shown in Fig. 12, to produce the friction plug H in the partially detached area E of the strip. During this forming operation the pressure element 103 in the die head 74 exerts pressure on the portion of the strip interposed between the pressure element and the forming element 78 to produce a proper drawing action. The plug forming element 78 and the die head 74 then return to their normal positions to clear the friction plug H and thus permit advancement of the strip A for a repeat plug forming operation on the next succeeding partially detached area E in the strip.

In performing such a drawing operation upon fibrous material, due allowance must be made to permit surrounding portions of the material to move toward and into the die as the drawing proceeds, otherwise the material will break or tear because fibrous material, unlike most metallic materials, has very little stretching properties. It is for this reason that each partially detached area E in the strip A is surrounded or defined by the triangular openings C, connecting slits D, and the side edges of the strip. It is also for this reason that the partially detached area E of the strip is held in a slip grip between the die members 73 and 74 at the station G.

In order to allow for this movement of the material of the strip A into the die mechanism at the station G during the drawing operation, provision is made to permit the portion of the strip ahead of the die to advance the extra required amount and to allow for the portion of the strip beyond the die to move back or be retracted toward the die while still being held taut to prevent buckling and entanglement of the finished end of the strip.

To provide for the extra material ahead of the die mechanism at the station G, the die head 74 is equipped with a strip locating or gauging stop device. This device comprises a pair of spaced and parallel vertically disposed stop pins 111 (Figs. 1, 2, 5, 10 and 11) which are located transversely of the strip A at a predetermined location just beyond the plug forming element 78 in the stationary die member 73 and are vertically aligned over the longitudinal path of travel of the openings C produced in the strip for insertion thereinto during the cycle of advancement of the strip as shown in Fig. 10. The stop pins 111 are secured in a vertical slide 112 which extends transversely of the stationary die member 73 and which operates in a pair of spaced and parallel vertical slide ways 113 formed in the machine frame 25 (See Fig. 1).

The slide 112 is lowered and raised by cam action in time with the other moving parts of the machine. For this purpose the upper end of the slide is pivotally attached to a link 114 (Figs. 2 and 5), the upper end of which is pivotally attached to one end of a lever 115 freely mounted on the long pivot shaft 66. The opposite end of the lever 115 carries a cam roller 116 which operates against an edge cam 117 mounted on the main drive shaft 31.

Hence as the main drive shaft 31 rotates the cam 117, the slide 112 moves down toward the stationary die member 73 and inserts the stop pins 111 into clearance holes 118 in the die member 73 to locate and stop the strip for the drawing operation and then lifts the slide 112 to clear the pins 111 of the strip to permit further advancement of the strip. The downward movement of the stop pins 111 takes place while the strip A is being moved forward by the feed rollers 21, 22 and while a set of the openings C in the strip A are moving through the station G. Just before the termination of the feeding operation, the stop pins 111 enter the openings C and engage against the strip adjacent the trailing edges of the openings as best shown in Fig. 10. This stops the portion of the strip A at the station G and locates the partially detached area E of the strip at the station relative to the plug forming element 78.

However the feed rollers 21, 22 continue to momentarily advance the portion of the strip ahead of the station G and thus buckle the strip to provide an excess of material between the station G and the station B as best shown in Fig. 11. This excess material should be at least equal to the height of the friction plug H so that when the plug H is formed this excess material will be drawn into the dies without tearing or breaking the strip, as shown in Fig. 12.

In order to provide for forward advancement of the finished end of the strip beyond the stationary die member 73 and still allow for freedom of the strip to move backward into the die for the drawing operation, the portion of the strip beyond the die is maintained in a free or floating condition under a fluid pressure directed against the strip and in a direction away from the die by an auxiliary feeding device. For this purpose the portion of the strip A beyond the die 73 extends through an enclosed tunnel 121 (Figs. 1, 2, 8 and 9) which comprises upper and lower substantially rectangular longitudinal tunnel members 122, 123 hinged together along one edge by hinge lugs 124 and pintles 125 and locked along their opposite edges by clamp bolts 126. One end of the lower tunnel member 123 is secured to the machine frame 25 while the opposite outer end is supported on a bracket 127 secured to the frame 25.

The adjacent inner faces of the tunnel members 122, 123 are formed with longitudinal grooves or channels 128, 129 respectively which provide clearance tracks for the passage therethrough of the strip A and the friction plugs H formed therein. The outer faces of the members 122, 123 are formed with respective recesses or chambers 131, 132 which are covered with exterior plates 133. A fluid pressure medium such as compressed air is introduced into the chambers 131, 132 by way of inlet pipes 134, 135 which lead from any suitable source of this pressure medium (see Figs. 8 and 9).

The pressure medium introduced into the chambers 131, 132 is projected in jet form into the track channels 128, 129 by way of a plurality of ports or passageways 137 formed in the tunnel members 122, 123 and communicating with the chambers 131, 132 and channels 128, 129. There preferably are two longitudinal rows of these ports 137 disposed intermediate the edges of the channels 128, 129. All of the ports 137 are disposed at an angle to the path of the strip through the tunnel and extend in a direction toward the strip and away from the die member 73 so as to project jets of the fluid pressure medium against opposite sides of the strip and the friction plugs H formed therein to support the strip in a floating or freely suspended condition while tending to advance the strip and thus keep it in a taut condition beyond the die 73.

During advancement of the strip A by the feeding rollers 21, 22 at the entrance end of the machine, while all die mechanisms at the stations B, G are clear of the strip, the jets of fluid pressure medium in the tunnel 121 advance the strip through the tunnel and thus pull the strip forward through the entire machine beyond the feed rollers without cumulative stretching or cumulative buckling of the strip, thereby keeping the entire strip taut during the feeding operation and until the stop pins 111 move down to locate the strip at the station G. Thereafter the pressure medium holds the strip taut beyond the stop pins 111.

During the plug forming operation, this yieldable or resilient fluid pull on the strip A beyond the stop pins 111 allows the strip to be drawn backward into the die 73 to provide the extra material necessary to produce the required draw without in any manner applying sufficient pressure on the strip to break or tear it apart. Also during this drawing operation, the stop pins 111 are lifted clear of the strip as soon as the strip beyond the die 73 begins to be drawn back, so that they do not interfere with the backward movement of the strip.

With such a construction of the tunnel 121, the strip A is always maintained in a taut free or floating condition so that it can readily move in either longitudinal direction in accordance with the requirements of the operations being performed on the strip. As the finished strip A leaves the tunnel 121 it rides over a guide rail 139 (Fig. 8) which directs it to any suitable place of deposit for the separation of the connected friction plugs H into separate units.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for treating a strip of flimsy material, the combniation of drawing means for successively producing projections in said strip in successive drawing operations, intermittently operable primary feeding means disposed in advance of said drawing means for advancing said strip in a substantially horizontal direction to said drawing means for said drawing operations, and auxiliary feeding means disposed beyond said drawing means for cooperation with said primary feeding means for advancing said strip into said drawing means and for withdrawing said strip from said drawing means without cumulative stretching or buckling by maintaining said strip under constant resilient tension which perimts the strip to be drawn backwardly from said auxiliary feeding means during the formation of said projections, said auxiliary feeding means comprising means for directing a stream of compressed gas at said projections formed in said strip by said drawing means in a direction away from said drawing means.

2. The machine of claim 1 wherein said primary feeding means includes a pair of opposed, intermittently operable feed rollers.

3. The machine of claim 1 wherein said auxiliary feeding means includes a longitudinal tunnel provided with a track through which said strip extends, said tunnel also being formed with a plurality of oppositely inclined ports for directing a compressed gas against both sides of said strip.

4. In a machine for treating a strip of flimsy material, the combination of drawing means for successively producing projections on said strip in successive drawing operations, intermittently operable primary feeding means disposed in advance of said drawing means for advancing said strip in a substantially horizontal direction to said drawing means for said drawing operations, auxiliary pneumatic feeding means disposed beyond said drawing means for directing a compressed gas against said strip in a direction away from said drawing means to maintain said strip under constant resilient tension to thereby assist said primary feeding means in advancing said strip and to permit backward movement of that portion of said strip beyond said drawing means toward said drawing means during each of said drawing operations, stop means disposed adjacent said drawing means for stopping said strip prior to the termination of each feeding operation of said intermittently operable primary feeding means to provide an excess of material in that portion of said strip between said drawing means and said primary feeding means to permit forward movement of said portion of said strip toward said drawing means during each of said drawing operations, means for actuating said stop means in timed relation with movement of said primary feeding means and said drawing means to alternately stop and release said strip, and clamping means adjacent said drawing means for clamping said strip in a slip grip after it is stopped by said stop means and during the subsequent drawing operation to permit said backward and forward movements of said strip toward said drawing means.

5. In a machine for treating a strip of flimsy material, the combination of means for successively forming projections in said strip from strip material at the location of each projection and from adjacent strip material drawn toward said forming means and into the projection by said forming means, primary feeding means disposed in advance of said forming means for advancing said strip to said forming means, and auxiliary feeding means disposed beyond said forming means for cooperation with said primary feeding means for advancing said strip to said forming means and for withdrawing said strip from said forming means, said auxiliary feeding means comprising means for directing a fluid under pressure against said strip and the projections formed therein in a direction away from said feeding and forming means to maintain said strip under constant resilient tension, thereby permitting said drawing of material toward the forming means while a projection is formed and preventing cumulative stretching or buckling in the advancing flimsy strip material.

6. In a machine for treating a strip of flimsy material, the combination of a plurality of horizontally aligned and spaced stations for performing a plurality of operations on said strip, at least one of said stations having means for successively forming projections in said strip from material at the location of each projection and from adjacent strip material drawn toward said forming means and into the projection by said forming means, intermittently operable primary feeding means disposed in advance of said stations, and auxiliary feeding means disposed beyond said stations for maintaining said strip under constant resilient tension, said primary feeding means and said auxiliary feeding means cooperating to advance said strip in a substantially horizontal direction through said operating station in a step by step movement, said auxiliary feeding means including a plurality of inclined ports for directing a plurality of jets of a compressed gas at said strip and said projections therein in a direction away from said primary feeding means and said operating stations to maintain said strip under constant resilient tension, thereby permitting said drawing of material toward the forming means while a projection is formed and preventing cumulative stretching or buckling in the advancing flimsy strip material.

References Cited in the file of this patent

UNITED STATES PATENTS

| | | |
|---|---|---|
| 1,768,294 | Reid | June 24, 1930 |
| 2,037,806 | Little | Apr. 21, 1936 |
| 2,380,440 | Hothersall | July 31, 1945 |
| 2,639,645 | Sonnenberg | May 26, 1953 |